United States Patent [19]

Hearn et al.

[11] Patent Number: 5,216,655
[45] Date of Patent: Jun. 1, 1993

[54] METHOD AND APPARATUS FOR SURFACE REALLOCATION FOR IMPROVED MANUFACTURING PROCESS MARGIN

[75] Inventors: Patrick Hearn, Acton; Fernando A. Zayas, Stow; Antonios E. Prentakis, Cambridge; William D. Lewis, Northborough, all of Mass.

[73] Assignee: Digital Equipment Corporation, Maynard, Mass.

[21] Appl. No.: 721,061

[22] Filed: Jun. 26, 1991

[51] Int. Cl.[5] .......................................... G11B 27/36
[52] U.S. Cl. ........................................................ 369/58
[58] Field of Search ................. 360/53, 54; 369/54, 369/59, 32; 364/200, 900

[56] References Cited

U.S. PATENT DOCUMENTS

| | | | |
|---|---|---|---|
| 4,420,807 | 12/1983 | Nolta et al. ............................. | 364/200 |
| 4,434,487 | 2/1984 | Rubinson et al. ..................... | 364/200 |
| 4,498,146 | 2/1985 | Martinez ................................ | 364/900 |
| 4,903,198 | 2/1990 | Iwasaki .................................. | 364/200 |
| 4,935,825 | 6/1990 | Worrell et al. ........................ | 360/54 |
| 5,146,571 | 9/1992 | Logan ..................................... | 395/400 |

Primary Examiner—Donald E. McElheny, Jr.
Attorney, Agent, or Firm—Barry N. Young; Dirk Brinkman

[57] ABSTRACT

In the manufacture of a high capacity data storage device having multiple surfaces for recording information, the yield of the manufacturing process is improved by providing the storage device with a spare surface. If a recording surface is found to be totally defective, or, substantially worse than the other surfaces, as determined by the manufacturing testing procedures, that surface is, by means of a remapping table, logically retired and the information intended for the defective surface is stored on the logically reallocated spare surface.

7 Claims, 5 Drawing Sheets

METHOD AND APPARATUS FOR SURFACE REALLOCATION FOR IMPROVED MANUFACTURING PROCESS MARGIN

FIELD OF THE INVENTION

This invention relates to data storage devices used in data processing systems, and in particular to a method and apparatus for detecting and correcting defects in storage devices having multiple recording surfaces.

BACKGROUND OF THE INVENTION

Various types of data storage devices have been developed including high capacity devices that have multiple recording surfaces. A conventional magnetic or optical storage device is typically manufactured as three separate assemblies, the medium, the heads and the controller, which are integrated as a single storage device during one of the final steps in the production process.

A conventional medium assembly includes a plurality of double sided disks arranged in a stack on a central spindle typically rotated by a motor. Each side of each disk is usually plated with a magnetically or optically sensitive coating to form a recording surface for information which is organized in sectors spaced along concentric or spiral tracks on each of the recording surfaces.

The head assembly is used for recording and retrieving the information stored in a sector. Generally the head assembly includes at least one read/write head for each of the surfaces. Each head is typically mounted on a positioning arm which is linked to a servo positioning mechanism capable of moving all heads in unison in a radial or lateral direction over the recording surfaces. Some storage devices may include multiple head assemblies for a single medium assembly.

The controller assembly is used for managing the information flow between the computer system and the medium. A conventional controller assembly may include one or more microprocessors and memories to perform the complex tasks of address translation, head positioning, data transfer, data correction and performance optimization.

Various environmental influences, faulty components parts, contamination and production problems may render a read/write head or surface defective during the manufacturing process, decreasing the production yield or process margin. As a result of these problems, the manufacturers of storage devices have taken precautions to detect and minimize such defects. Typically, the medium, head and controller assemblies are extensively tested before they are put together to form a storage device. However, unintentional contact between the head and surface in the final assembly may cause additional damage to the surface or the head. Also, a complete functional test of the device is not possible until the storage device is fully assembled. Performance testing after assembly may detect additional faulty devices that may need to be scrapped or repaired, further diminishing the manufacturing process margin.

Several approaches or techniques have evolved which partially tolerate limited damage to the recording surface. These techniques allow the use of a faulty device having minimal surface defects without disassembly and repair. A first technique, for very small physical surface defects, is to provide the controller with an error detection and correction capability which can mathematically reconstruct bursts of erroneous data by using correction codes stored with the data. A second technique, used if the error rate exceeds the capabilities of the error correction codes, simply marks the sector containing the surface defect as invalid. A substitute sector within a predesignated spare sector area is provided by the manufacturer to record the information of the damaged sector. A third technique, for larger defects, provides each track with reserve recording space. With this technique, the sectors in the track containing a surface defect are shifted or displaced around the defect in the track. A fourth technique invalidates an entire track and redirects the information to a substitute track elsewhere on the surface.

A disadvantage of conventional correcting techniques is that in avoiding damaged surface areas the access time to the information is increased. Yet another disadvantage of the above techniques is that they only allow the use of faulty devices where the defects are limited to the medium.

The process margin of conventionally manufactured high capacity multi-surface devices may yield only a fractional number of devices where all surfaces and heads are fully functional. More typically, in a substantial number of devices, at least one or more surfaces and/or heads are found to be of marginal or substandard performance.

Therefore, it is desirable that a storage device be constructed with a surface and head reallocation mechanism which improves the yield of the manufacturing process without unduly decreasing the storage capacity of the storage device or requiring disassembly, repair, and reassembly of defective storage devices.

SUMMARY OF THE INVENTION

In accordance with principles of the present invention, a storage device with multiple surfaces may have an entire surface "retired" instead of repairing or replacing the surface or head having marginal or defective performance characteristics. Accordingly, the device is constructed with a "spare" surface which allows the logical retirement and reallocation of a surface without diminishing the desired storage capacity.

One feature of the invention provides the controller with the capability to maintain a physical to logical surface remapping table. In this table the pre-defined "logical" surfaces of the device are kept in consecutive order even if there is an intervening defective and logically retired physical surface. In order to determine on which a surface a particular sector is located, the controller first determines the logical surface number for the sector and second, selects the corresponding physical head for reading a physical surface by means of the remapping table.

The remapping table, as another feature of the invention, is recorded on each one of the storage device surfaces so that the table can be reliably read during the lifetime of the device, or if the head or controller assemblies are replaced. As another feature of the invention the performance of the storage device is improved even if all surfaces are found to be acceptable. In a fully functional storage device, the surface with the worst relative performance characteristics with respect to all other surfaces is retired in any case. In the case where the storage device does not have one particular worst surface, the spare surface is retired, but with an indication that it is available for reactivation should another surface or head, during subsequent operation, develop a non-correctable defect.

DETAILED DESCRIPTION OF THE PREFERRED EMBODIMENT

Figure 1:
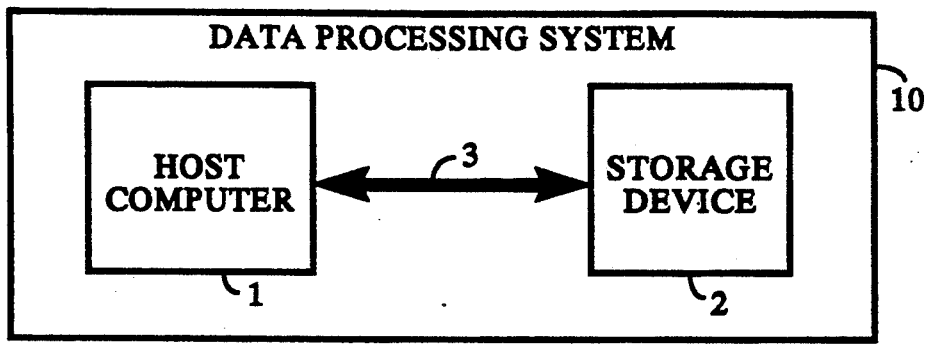
FIG. 1 is a block diagram of a data processing system embodying the present invention.

FIG. 1 is a block diagram of a data processing system 10 embodying the present invention. System 10 includes a host computer 1 (having a central processor, primary memory storage and input/output devices, not shown) coupled to a secondary storage device 2 by a system bus 3. Host computer 1 can store and retrieve information by communicating with the secondary storage device 2 over system bus 3.

Figure 2:
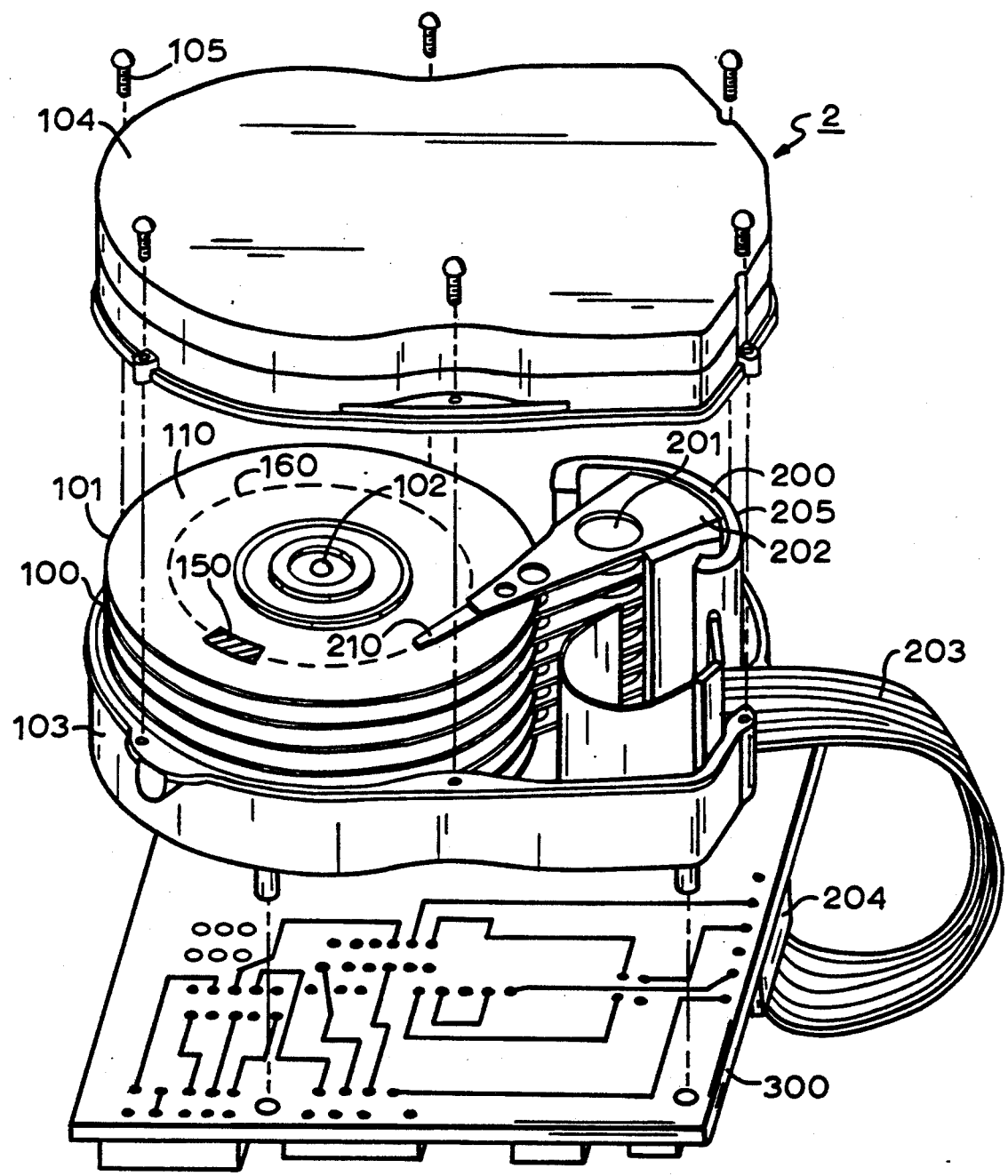
FIG. 2 is an exploded view of a storage device manufactured in accordance with principles of this invention.

An exploded view of a typical high capacity storage device 2 is shown in FIG. 2. The storage device 2 includes a media assembly 100, a head assembly 200 and a controller 300. The particular media assembly 100 shown in the arrangement of FIG. 2 includes a plurality of disks, by way of example eleven, with only the top disk 101 being shown in its entirety in the view of FIG. 2 for reasons of clarity. Each of the disks, including the top disk 101, has two recording surfaces, only one of which, top surface 110 is shown.

The top surface 110 is coated with a magnetically or optically sensitive material and in accordance with known principles can be used to store bits of information on discrete areas of the surface 110. The disks 101 are mounted on a spindle 102 which is rotated by a drive motor, not shown. The media assembly 100 is arranged so that it may be removed for repair or replacement.

The head assembly 200 is typically in the form of a movable axis 201 from which project a plurality of radial arms, one for each surface 110, with only the top arm 202 being shown in its entirety. Near the end of the top arm 202 away from the axis 201 there is mounted a read/write head 210 that is arranged in close proximity to surface 110 of disk 101 for the purpose of recording and reading digital information magnetically or optically encoded on the surface 110. The head assembly 200 includes an actuator servo mechanism 205 by which the read/write head 210 can be positioned at various radial distances from the center of the disk 101.

The media assembly 100 and head assembly 200 are typically enclosed within a bottom cover 103, which usually also serves as the mounting base, and a top cover 104, secured to one another by screws 105. The covers 103 and 104 provide a hermetically sealed environment for the media and head assemblies, 100 and 200, excluding dust and other contaminants which may damage the head 210 or surfaces 110 during operation. Each of the read/write heads 210 is selectively coupled to the controller assembly 300 by cable 203 and connector 204.

The controller assembly 300 generally includes one or more microprocessors coupled by internal buses to memory buffers and caches. The signal lines from the read/write heads 210 are coupled to analog and digital signal processors for converting and generating signal pulses. Functions normally performed by the controller 300 include data transfer, data correction, data caching, performance optimization, and address translation.

Information stored on the surfaces 110 is usually arranged in a spiral or concentric tracks, such as track 160, and the tracks are usually organized into multiple sectors, such as sector 150, as shown in in FIG. 2. Each sector 150, sometimes referred to as a "block", typically contains a fixed number of bytes of information, by way of example 512 bytes. The sectors 150 are generally the smallest addressable amount of information in the storage device 2. That is, information is exchanged between the computer system 1 and the storage device 2 in blocks of data having 512 bytes. The number of tracks per surface and number of sectors per track can vary, and are determined by timing and sector address information, permanently recorded on the surfaces during manufacturing processes generally known as calibration and formatting.

For the purpose of addressing the sectors 150 in typical controller 300 logically numbers the sectors 150 in one continuous sequence. In other words, the first sector 150 on the first track 160 (as determined by the not shown timing and address information) of the top surface 110 of the top disk 101 is logically addressable as sector "0". Likewise, the last sector on the last rack on the bottom surface of the bottom disk is logically addressable as sector "N", where "N" can be calculated by multiplying, the number of sectors per track, which may vary track to track, the number of tracks per surface and the number of surfaces per storage device 2. Conversely, to determine the surface 110 on which a particular sector 150 resides, for the purpose of read/write head 210 selection, the controller 300 performs the appropriate divisions on the sequential logical sector number.

The present invention is directed to improving the manufacturing process margin for a storage device 2 of the type shown in the arrangement of FIG. 2 when defects are detected after the media, head and controller assemblies 100, 200 and 300 have been integrated into the single storage device 2. Although extraordinary care is normally exercised by the manufacturer in assembling and testing the component parts, a thorough functional evaluation can not be performed until the unit is fully assembled.

Minute variations in the medium assembly 100 and the recording surface 110 may not be revealed until information is actually written onto the surface 110. Also, because of the precise mounting requirements of the read/write head 210 with respect to the surface 110, an improper yaw angle of the head can render the surface 110 unusable. Furthermore, with the increased miniaturization of head technology, by way of example the use of thin film heads, a defective or weak head can also effectively render the corresponding surface 110 to be essentially non-functional.

Figure 3:
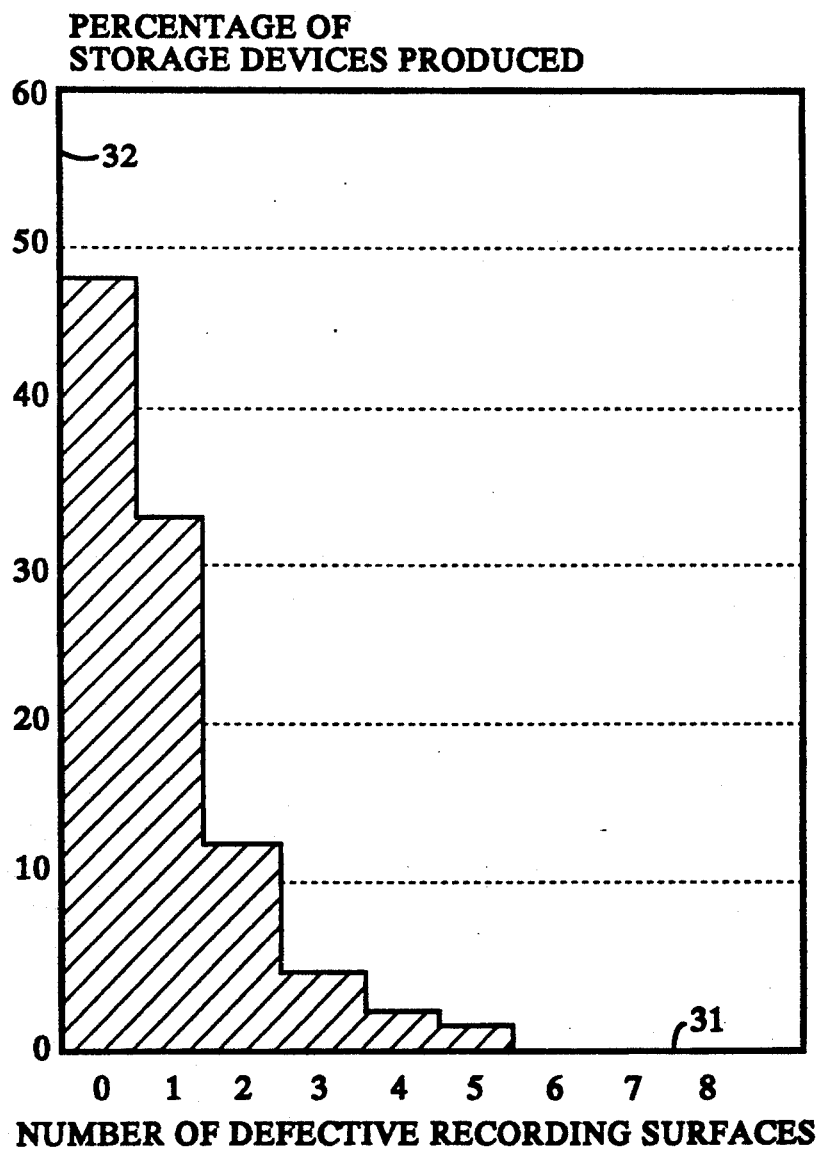
FIG. 3 is a bar graph, for a manufacturing lot of storage device of the type shown in FIG. 2, showing the percentage distribution of defective storage devices grouped by the number of defective surfaces per storage device.

The bar graph of FIG. 3 shows, for a sample manufacturing lot of several hundred storage devices, the percentage of defective storage devices, grouped by the number of defective surfaces per drive. For the purpose of the graph, a disk drive in the lot is deemed defective if it has one or more uncorrectable (using conventional correcting techniques) defective surfaces. The horizontal axis 31 in FIG. 3 indicates the number of defective surfaces, and the vertical axis 32 indicates the percentage of the storage devices in the lot that have the indicated number (on the horizontal axis 31) of defective surfaces. As shown on the graph, only about half of the storage devices in the lot shown have zero defective surfaces, and over thirty percent of the devices have one defective surface 100.

In the past, other than correcting localized defects in the medium assembly 100 with the use of conventional correction techniques, manufacturers of storage devices have generally required that all recording surfaces 110 be functional unless a surface 110 was specifically designed not to be used, such as for example, a storage device having the top and bottom "guard" surfaces. Therefore, typical process margins for traditional storage devices can be as low as 50%.

With the invention the manufacturing process margin is substantially improved, from a yield of under fifty percent to a yield of over eighty percent by utilizing a "spare" surface and a logical surface reallocation technique. According to the invention, if a surface 110 is found to be defective by failing to meet particular manufacturing test parameters, the surface is logically "retired" and the controller 300 redirects information intended for that defective surface to the spare surface. As an additional feature of the invention, the reliability of the device 2 is further improved by logically retiring the surface 110 with the "worst" performance characteristics, even if it is found that no single surface 110 is totally defective.

Figure 4:
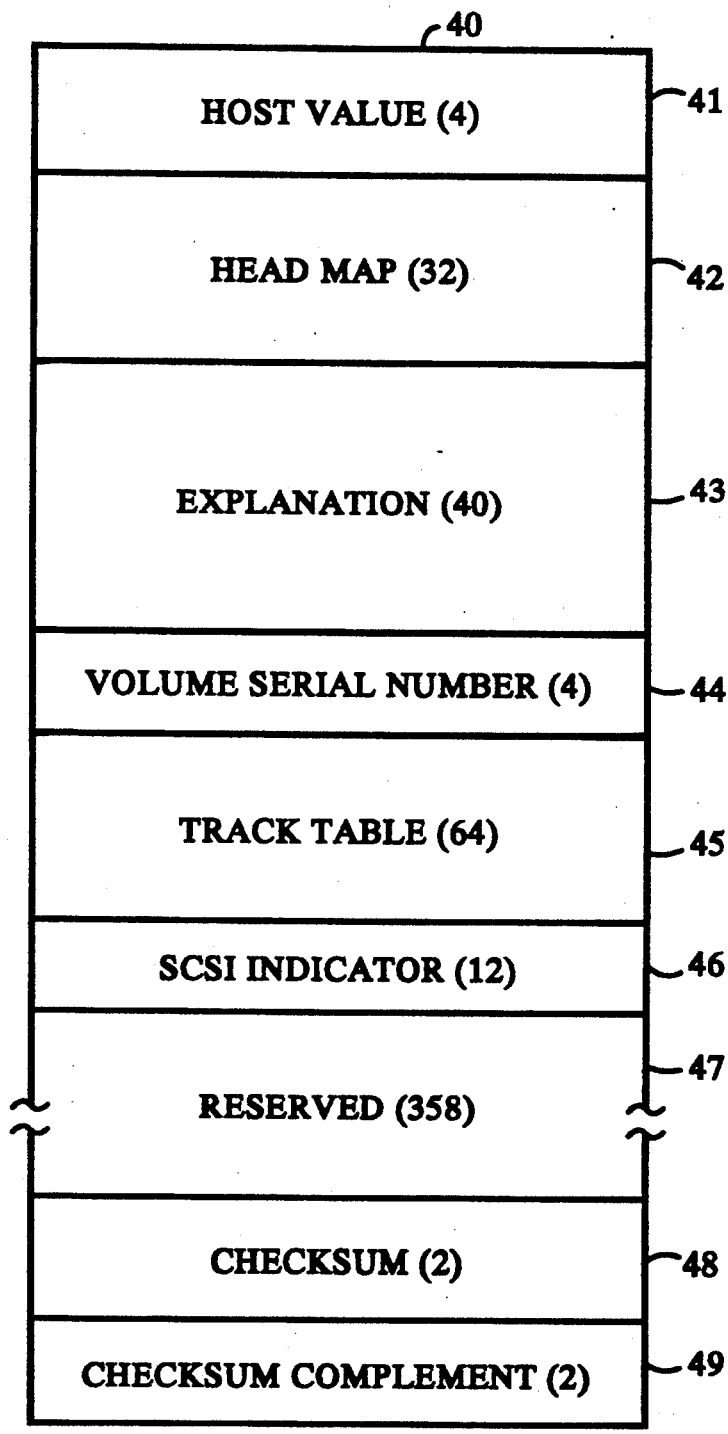
FIG. 4 is a diagram of a surface retirement block (SRB) according to the present invention.

FIG. 4 is a diagram of the format of a surface retirement block (SRB) 40 for indicating the existence and location of the defective surface 110 as employed by the present invention. The SRB 40, when recorded on the medium assembly 100, is the permanent record of the usable and defective surfaces 110 of the storage device 2. The SRB 40, according to the invention, is a 512 byte block of data having the following fields: a 4 byte host value 41, a 32 byte head map 42, a 40 byte explanation 43, a 4 byte volume serial number 44, a 64 byte track table 45, a 12 byte SCSI indicator 46, a 358 byte reserved field 47, a 2 byte checksum 48, and a 2 byte checksum complement 49.

The bytes in the host value 41 field are reserved for use by the host computer 1 and will not be described here. The head map 42 bytes are for indicating a retired surface 110 (or head 210) and for logically reallocating the remaining usable surfaces 110. Although thirty-two bytes have been allocated for the head map 42 in the exemplary SRB 40, the storage device 2 of FIG. 2 having twenty-two surfaces 110 uses only the first 22 bytes of the head map 42. The detailed structure and use of the head map 42 is explained with particularity with reference to FIGS. 5 and 6. The bytes in the explanation 43 are for storing an explanatory message in a free text format, for example, as ASCII characters, stating the reason for retiring a particular surface 100 (or head 210). The bytes of the volume serial number field 44 contain the manufacturing serial number for the storage device 2. The track table 45 bytes contain the physical track number of the first logical track 160 on each surface 110. The bytes of the SCSI indicator 46 contain a non-zero value if the device 2 has been used with a SCSI type interface. The reserve field 47 bytes in the SRB 40 are unused. The last two fields in the SRB 40, fields 48 and 49, respectively contain the checksum and the complement of the checksum of the data stored in the SRB 40.

Figures 5, 6:
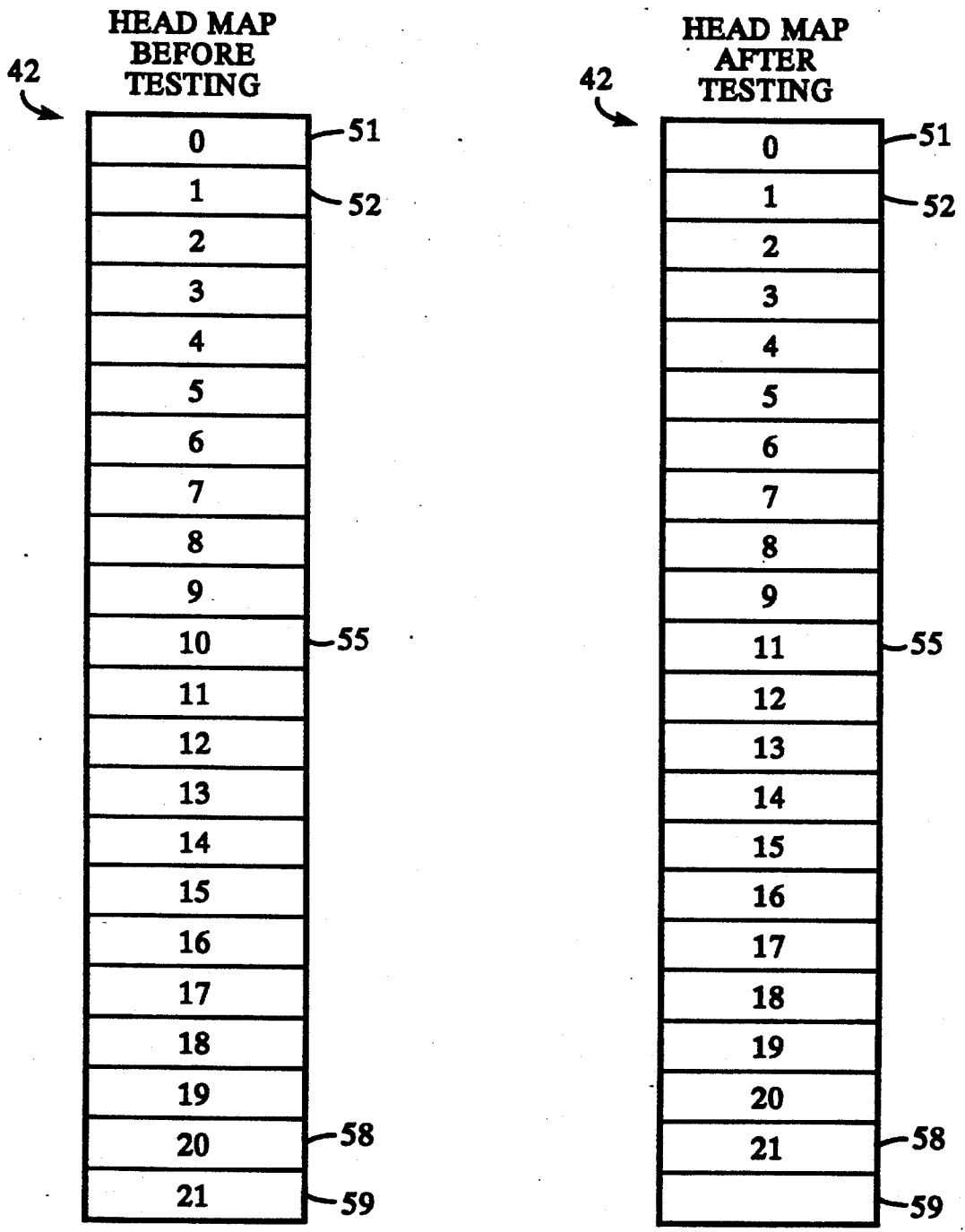
FIG. 5 is a diagram of a head map field of the SRB of FIG. 4 before surface reallocation according to the invention.
FIG. 6 is a diagram of the head map of FIG. 5 after surface reallocation.

The detailed structure and use of the bytes of the head map 42 portion of the SRB 40 may be better understood by referring to FIGS. 5 and 6, which show the contents of the bytes of the head map 42 before and after testing respectively. Each byte position in the head map 42 corresponds to a "logical" surface number and the contents of the byte corresponds to a "physical" surface number.

The head map 42 is initialized, as shown in FIG. 5 prior to testing, to have each "logical" surface number be equal to the "physical" surface number. For example as shown in FIG. 5, the first byte 51, referring to the first "logical" surface number, contains a "0" corresponding to the first "physical" surface number. Similarly, the second byte 52 contains a "1", and so forth. The eleventh byte 55, contains a "10" referring to physical surface "10". The twenty-first byte 58 corresponds to the last usable "logical" surface 110 of the storage device 2. In other words, the storage device 2 is designed to have exactly twenty-one addressable "logical" surfaces. The twenty-second byte 59 corresponds to the designed "spare" surface, physical surface "21".

Figure 7:
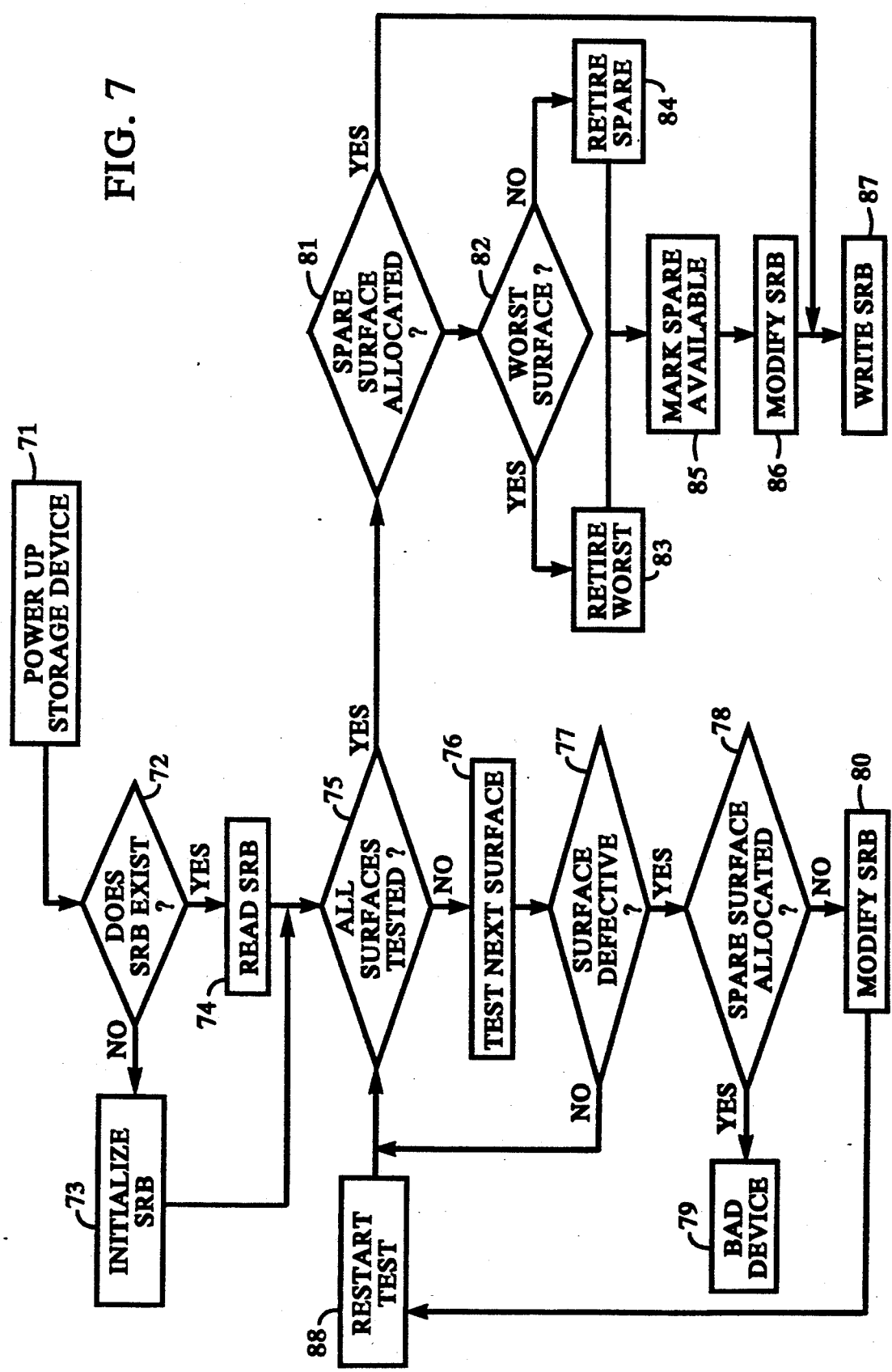
FIG. 7 is a flow chart of a procedure for generating the SRB.

During the test procedures for locating a defective surface the contents of the bytes of the head map 42 are modified to logically retire and reallocate defective surfaces 110. FIG. 6 shows the contents of the head map 42 after testing. Initially, logical surface "10" was stored on on physical surface "10" (see FIG. 6). During testing, for example, physical surface "10" was found to be defective. Logical surfaces "10" to "20" are logically reallocated to physical surfaces "11" to "21", as shown in FIG. 7. In other words, physical surface "10" has been logically retired from byte 55 of the head map 42.

The head map 42 is used by the controller 300 (of FIG. 2) to logically translate a logical surface number to a physical surface number. First, the controller 300 calculates, using conventional techniques, a logical surface number from the sequential sector address supplied to it by the host computer 1 (of FIG. 1). Second, the controller 300 translates the logical surface number to a physical surface number by extracting the corresponding physical surface number in the head map 42. Third, the controller 300 selects the read/write head 210 corresponding to the extracted physical surface number.

One copy of the SRB 40 is written on every surface 110 of the storage device 2 to ensure in part defect tolerance, by providing redundancy of information. Having multiple copies of the SRB 40 ensures that there is a high likelihood of having an intact SRB 40 during the future operation of the storage device 2. According to the embodiment of the present invention, the SRB 40 is written in sector "0" of track "1990" of each surface 110, except possibly the retired surface if either the head 210 of the surface 110 are determined to be totally nonfunctional.

Steps in the manufacturing process of the storage device 2 which provide a suitable opportunity to generate the SRB 40 (of FIG. 4) include calibration, formatting and burn-in.

Calibration is generally the process during which the fundamental recording characteristics of the storage device 2, such as the track positions, and the head alignments, are established, measured and tested. Conventional parameters which are tested during calibration include: head output, servo gain margin, detent performance and seek error rate.

Formatting is the process that partitions each track into addressable sectors. During formatting, firmware in the controller 300, (or software in the host computer 1) records skeletal sectors on the storage device 2, each sector including address information in a sector preamble. Typically during formatting "bad" sectors are detected and redirected elsewhere, if possible.

During burn-in the storage device 2 is exercised and stressed under simulated load conditions at various environmental extremes such as temperature, humidity and atmospheric pressure. One parameter monitored measured during burn-in is the "growth-rate" of defects, which generally is a measure of the viability of the storage device 2.

Now with reference to FIG. 7, the general procedure used to generate the SRB 40 of FIG. 4 during any of the aforementioned manufacturing tests is further described. FIG. 7 is a flow chart illustrating steps executed for generating an SRB. Other manufacturing steps not necessary for generating an SRB have been omitted for clarity.

In block 71, power is applied to the storage device 2 to start rotating the medium assembly 100, to load the head assembly 200, and to activate the (not shown) electronic components and firmware of the controller 300. During the preliminary tests of the storage device 2, the controller 300 can operate independently, that is, without being coupled to the host computer 1 via system bus 3 (of FIG. 1). Then controller 300 enters block 72.

Because testing may be done at various manufacturing stations and at various times in the manufacturing process, including repeats of previous tests, if necessary, it must be first be determined whether an SRB has been previously stored on the medium 100.

Therefore, in block 72, after the medium 100 is rotating at the correct speed, firmware of the controller 300 determines if a SRB 40 has been previously written to the medium 100. If there is no previously recorded SRB, the steps of block 73 are executed whereby the controller 300 intilializes an SRB in its memory containing default values, otherwise, if there is a SRB, the steps of block 74 are executed to read the previously writtern SRB.

In block 73, if a previously recorded SRB 40 is not found on the medium 100, the firmware initializes a skeleton SRB 40 in the controller 300 memory in the form shown in FIGS. 4 and 5. Then controller 300 enters block 75.

Otherwise, in block 74, the firmware reads the SRB 40 from the medium 100 into the memory of controller 300. Then controller 300 enters block 75.

In either case, starting with block 75, either after the controller 300 has initialized the SRB 40 in its memory, as in block 73, or if the controller has read the SRB 40 from the medium 100, as in block 74, the various testing procedures for all of the surfaces (or heads) of the storage device 2 may commence. For clarity, the flow chart illustrates the steps for testing all of the surfaces for one particular test. After all surfaces have been tested for a particular test, the steps of the flow chart of FIG. 7 may be immediately repeated for another test starting with block 75, or the steps starting with block 71, may be repeated on a subsequent "power-up".

In block 75, the firmware of the controller 300 determines if all of the surfaces (or heads) have been tested. If all surfaces have not been tested, the next surface (or head) is selected for testing by the steps of block 76, otherwise, the steps of block 81 are executed. In other words, a particular test is performed on each of the twenty-two surfaces, including the spare surface, of storage device 2 in sequence.

In block 76, if an additional surface needs to be tested, as determined by the steps of block 75, the firmware performs the test on the selected surface. The actual tests performed are conventional and will not be described here. The controller 300 enters block 77.

Then in block 77, the firmware determines if the current surface (or head) selected for testing is defective or not. If no defects are found on the current surface the firmware cycles control back to block 75 to select the next surface.

Otherwise, in block 78, if a surface (or head) is found to be defective during the tests of block 76, the firmware determines if the spare surface is "available" for logical reallocation. That is, the firmware examines the SRB 40 (of FIG. 4) to see if physical surface "21" has been logically reallocated for a previously detected defective physical surface. If a spare surface is not "available" control transfers to the steps of block 79, otherwise, the steps of block 80 are performed.

In block 79, if the firmware determines that a spare surface is not "available" in block 78, the storage device 2 is declared "bad", and it is rejected from the manufacturing process. The storage device 2 after rejection can either be repaired and retested or it can be discarded.

Otherwise, in block 80, if the spare surface is "available", the firmware 300 modifies the bytes of the head map 42 of the SRB 40, as described in the associated descriptions for FIGS. 5 and 6, for the particular defective surface. In addition, a reason for the logical retirement of the defective surface, as detected in block 77, is noted in the bytes of the explanation field 43 of the SRB 40. Then controller 300 enters block 88.

In block 88, after the detection of a defective surface (or head), if the storage device 2 has not been declared "bad" in block 79, the entire test sequence is restarted by selecting the first surface and cycling the controller 300 back to block 75.

In block 81, after all of the surfaces (or heads) have been tested as determined in block 75, the firmware checks the SRB 40 to see if the spare surface is still "available", e.g. the spare surface has not been logically reallocated to a defective surface. If the spare surface is available the steps of block 81 are executed, otherwise, if the spare surface is not available the steps of block 87 are executed.

In block 82, if the spare surface is still available, the firmware determines whether one of the surfaces has performance characteristics substantially worse than the performance characteristics of all of the other surfaces, according to the particular test parameters measured and maintained by the steps of block 76 for each of the tested surfaces.

Then in block 83, if there is a "worst" surface as determined in block 82, the firmware selects that surface as the surface to be logically retired. Then controller 300 enters block 85.

Otherwise, in block 84, if there is no particular "worst" surface, the firmware arbitrarily selects the spare surface as the surface to be logically retired. Then controller 300 enters block 85.

In either case, in block 85, if the logically retired surface is not totally defective, as determined in block 83, or if the retired surface is the arbitrarily retired spare surface, as determined in block 84, the explanation field 43 of the SRB 40 (of FIG. 4) is marked with a message indicating that the spare surface is "available". That is, should the firmware detect, during subsequent testing, a totally defective surface by the steps of block 77, for the purposes of the steps of block 78, the spare surface is still "available" for logical reallocation to a subsequently detected totally defective surface. Then controller 300 enters block 86.

Then in block 86, the SRB 40 is modified to reflect the spare surface logical reallocation as previously described for the steps of block 80. Then controller 300 enters block 87.

In either case, in block 87, either after the SRB has been modified by the steps of block 86, or if the SRB 40 was previously modified as determined in block 81, the SRB 40 is written to the medium assembly 100 of the storage device 2 as a permanent record of the logical surface reallocation. At the completion of the testing a "non-defective" storage device 2 will have exactly twenty-one surfaces available for storing information.

After the controller 300 executes the steps of block 87, the storage device 2 may be powered-down and moved to another testing station for further testing, or another test can be immediately started by entering block 74.

It should be apparent to one skilled in the art that the present invention can also be adapted to a storage device of the type having removable recording medium. Also, when additional spare surfaces are included, the process margin can be further increased by tolerating multiple defective surfaces. Also the invention can be used with a controller of the type lacking firmware and memory, but under the direct control of the host computer 1.

While the present invention has been shown and described with particularity to a preferred embodiment therefore, it will be understood by those skilled in the art that the foregoing and other changes in form and detail may be made therein without departing from the spirit and scope of the present invention.

What is claimed is:

1. A method for accessing information and managing defects in a disk storage device in which information is stored on a plurality of media surfaces and a controller is connected to a plurality of read/write heads, at least one read/write head associated with each media surface, comprising the steps of:
   providing at least one spare media surface anywhere within the disk storage device;
   providing an associated spare read/write head for said spare media surface, said spare read/write head connected to the controller;
   writing, by means of the controller and the read write heads, information on each of the media surfaces;
   determining, by the controller and the read/write heads reading the information written in the writing step, if any one of the media surfaces or associated read/write heads is a defective media surface or a defective read/write head;
   retiring said defective media surface and said defective read/write head; and
   activating said spare media surface and said associated spare read write head to replace said defective media surface or said defective read/write head.

2. The method according to claim 1 further including the steps of:
   providing a head map having a plurality of entries for storing addresses of the media surfaces and the associated read/write heads, one entry for each of the media surfaces and the associated read/write head;
   removing a defective entry from said head map, said defective entry corresponding to said defective media surface or said defective read/write head;
   adding a spare entry to said head map, said spare entry corresponding to said spare media surface and said spare read/write head;
   addressing the read/write heads by means of said head map created by said providing and adding steps; and
   storing said head map on at least one of the media surfaces.

3. The method according to claim 1 further including the steps of:
   measuring, for each of the media surfaces, a level of performance characteristics;
   comparing said measured levels of performance characteristic;
   determining a worst media surface, said worst media surface having a worst level of performance characteristics,
   declaring, said worst media surface as said defective media surface.

4. In a data processing system including a host computer (1) a data storage device (2) connected to the host computer by a system bus (3), the data storage device including a plurality of media surfaces (110), a controller (300) connected to a plurality of read/write heads (210), at least one read/write head for each of the media surfaces, an apparatus for accessing information and managing defects comprising:
   at least one spare media surface;
   a spare read/write head connected to said spare media surface, said spare read-write head connected to the controller;
   means (76) for testing each of the media surfaces;
   means (77) for detecting if any one of the media surface or associated read/write heads is a defective media surface or a defective read/write head;
   means (84) for retiring said defective media surface and said defective read/write head; and
   means (85) for activating said spare media surface and said associated spare read write head to replace said defective media surface or said defective read/write head.

5. The apparatus as in claim 4 further comprising:
   a head map (42) having a plurality of entries (51-59) for storing addresses of the media surfaces and their associated read/write heads, one entry for each of the media surfaces and its associated read/write head;
   removing a defective entry (55) from said head map, said defective entry corresponding to said defective media surface or said defective read/write head;

adding a spare entry (59) to said head map, said spare entry corresponding to said spare media surface and said spare read/write head; and storing said head map on at least one of the media surfaces.

6. The apparatus as in claim 4 further comprising:

means (76) for measuring, for each of the media surfaces, a level of performance characteristics;

means (82) for comparing said measured levels of performance characteristic of the media surfaces to determine a worst media surface, said worst media surface having a worst level of performance characteristics, means (83) for declaring said worst media surface as said defective media surface.

7. A method for accessing information and managing defects in a disk storage device in which information is stored on a plurality of media surfaces and a controller is connected to a plurality of read/write heads, at least one read/write head associated with each media surface, comprising the steps of:

provide at least one spare media surface anywhere within the disk storage device;

providing an associated spare read/write head for said spare media surface, said spare read/write head connected to the controller;

writing, by means of the controller and the read write heads, information on each of the media surfaces;

determining, by the controller and the read/write heads reading the information written in the writing step, if any one of the media surfaces or associated read/write heads is a defective media surface or a defective read/write head;

retiring, if said determinining step determines that there is a defective media surface or a defective read/write head, said defective media surface and said defective read/write head;

measuring, for each of the media surfaces, a level of performance characteristics;

comparing said measured levels of performance characteristic;

determining a worst media surface, said worst media surface having a worst level of performance characteristics;

retiring, if there is no defective media surface or a defective read/write as determined by said determining step, said worst media surface and said associated worst read/write head;

activating said spare media surface and said associated spare read write head to replace said worst media surface or said worst read/write head; and addressing the read/write heads by means of said head map created by said providing and adding steps; and storing said head map on at least one of the media surfaces.

* * * * *